United States Patent [19]
Shaw

[11] 3,906,490
[45] Sept. 16, 1975

[54] ELECTRIC HORN
[75] Inventor: Charles W. Shaw, Flora, Ill.
[73] Assignee: Sparton Corporation, Jackson, Mich.
[22] Filed: Oct. 31, 1974
[21] Appl. No.: 519,508

[52] U.S. Cl. .............................. 340/388; 340/389
[51] Int. Cl.² ............................................ G08b 3/10
[58] Field of Search ............ 340/388, 389, 390, 391

[56] References Cited
UNITED STATES PATENTS
2,942,255  6/1960  Wetzel .............................. 340/388

*Primary Examiner*—Harold I. Pitts
*Attorney, Agent, or Firm*—Beaman & Beaman

[57] ABSTRACT

A warning signal, in particular a horn for boats, automobiles, or other vehicles, using any elongated open end projector and employing a vibrating diaphragm to produce sound vibrations within the projector. The diaphragm supporting end of the projector includes a mounting surface obliquely disposed to the axis of the projector whereby the diaphragm is "self-draining" preventing the accumulation of water within the projector, and adjacent diaphragm. Further, the oblique disposition of the diaphragm with respect to the projector axis permits the diaphragm housing, and associated motor, to be of a flattened configuration in the horizontal dimension permitting improved styling and appearance characteristics.

7 Claims, 4 Drawing Figures

ELECTRIC HORN

BACKGROUND OF THE INVENTION

The invention pertains to the field of warning signals using vibrating diaphragms to produce sound vibrations.

Horns for boats and other vehicles have long employed vibrating diaphragms to produce the audible signal desired. Such horns normally employ an elongated projector, either of a linear configuration, or of a curved form. For instance, the projector is often in a spiral configuration to conserve space. The outer end of the projector is open, while the "inner" projector end communicates with a diaphragm mounted at its periphery and vibratible at its central region by a motor, electric or air powered. As the diaphragm is rapidly vibrated the audible vibrations are amplified by the projector.

In the usual construction the diaphragm is generally of a flat or planar configuration and lies in a plane substantially perpendicular to the axis of the projector adjacent the diaphragm. However, in horns utilizing spiral configurations it is known to dispose the plane of the diaphragm in a plane substantially parallel to the projector axis as defined adjacent the diaphragm chamber.

Horns of the aforementioned type, particularly those employing substantially linear projectors, are often mounted exteriorly on a boat deck, or cab, hood or fender of an automobile or truck. Such horns are usually brightly plates and serve an ornamental appearance, as well as being functional. Of course, in such exterior installations the open end of the projector is disposed in the forward direction of the associated vehicle and rain, splash water, and snow will often enter the projector. Prior horn constructions often include chambers adjacent the diaphragm wherein water entering the projector can be trapped adjacent the diaphragm, and such trapped water will adversely affect the performance and output of the horn, corrode the diaphragm, and often render the horn inoperable. Also, such trapped water, when frozen, will render a vibrating diaphragm horn inoperable, and possibly damage the diaphragm.

Such "water traps" exist in horns wherein the plane of the diaphragm is perpendicular to the projector axis, or parallel thereto, and prior constructions have not been free of such water damage, requiring maintenance and replacement.

BRIEF DESCRIPTION OF THE INVENTION

It is an object of the invention to provide a warning device horn using a tubular open ended projector, and a vibration producing diaphragm wherein the diaphragm is so oriented as to be self-draining, and prevent the entrapment of water within the horn structure, either adjacent the diaphragm, or within the projector.

In the horn of the invention, the projector, the diaphragm chamber, and the structure adjacent the diaphragm chamber includes surfaces obliquely disposed to the horizontal such that these components are self-draining, and the diaphragm itself is obliquely disposed to the horizontal and projector axis to drain water therefrom which may be received within the diaphragm chamber.

The end of the projector upon which the diaphragm is mounted includes a cast element having an annular diaphragm mounting surface defined thereon obliquely related to a tubular projection received within the projector. The diaphragm mounting surface is so oriented that that portion thereof disposed closest to the open end of the projector is located at the bottom of the projector whereby the bottom of the diaphragm will be disposed closest to the projector open end and any water received on the diaphragm, or within the diaphragm chamber, will flow, by gravity, from the diaphragm toward the projector open end. Further, the cast element projection is formed with a conical surface diverging toward the projector open end to aid in the self-draining characteristics of the horn.

The oblique orientation of the diaphragm mounting surface, and diaphragm, permits the housing in which the diaphragm and the electric diaphragm actuating motor are mounted to be of a relatively limited vertical dimension, and thus the oblique orientation of the diaphragm permits a low profile appearance to be achieved without sacrificing diaphragm area or horn performance.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
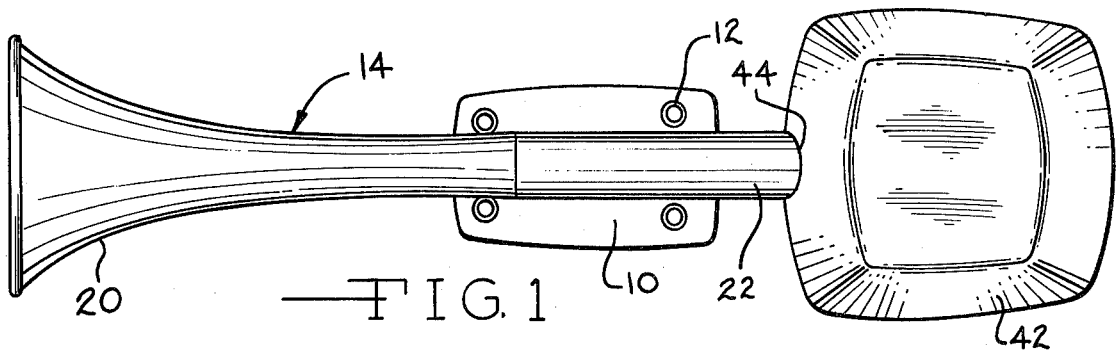
FIG. 1 is a plan view of a horn warning device in accord with the invention.

The warning device includes a mounting base 10, or ornamental exterior appearance, which includes a lower flange having mounting holes 12 located therein for receiving screws for fastening the horn to a boat deck, vehicle hood or cab, or the like. The upper portion of the base 10 is attached to an elongated projector 14, which may be formed of metal, or a synthetic material. Usually, the projector is bright plated, with chrome or nickel. The projector 14 includes a belled open end 20, and a "closed" end 22. The closed end 22 is closed by the cast diaphragm mounting element 24, and the associated diaphragm, as will be later described. The end 22 of the projector is of a tubular configuration, and closely receives the cast diaphragm supporting element stem 26.

Figure 2:
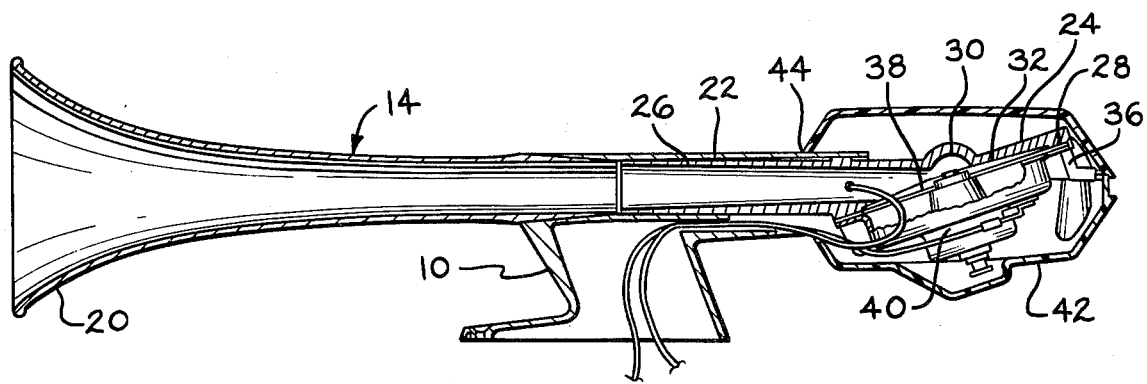
FIG. 2 is a diametrical, elevational, sectional view of the horn of the invention.
Figure 3:
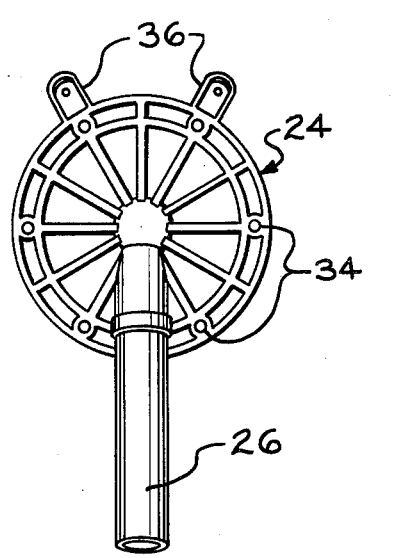
FIG. 3 is a top plan view of the cast diaphragm supporting element, per se.
Figure 4:
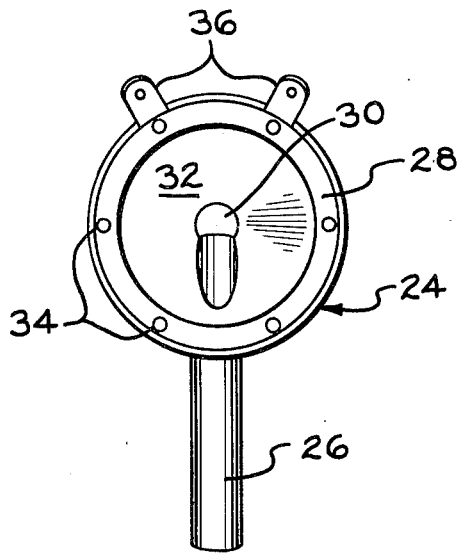
FIG. 4 is a bottom plan view of the cast diaphragm supporting element, per se.

The element 24 includes a substantially circular diaphragm support 28, and the tubular stem 26 intersects undersurface 32 as will be appreciated from FIGS. 2 through 4. The element undersurface 32 includes a central recess 30, located at the center of the annular planar diaphragm mounting surface 28, FIG. 4, and the bore of stem 26 intersects the undersurface 32 obliquely.

The diaphragm mounting surface 28 is provided with a plurality of fastener receiving openings 34 evenly spaced about the mounting surface, and a pair of ears 36 extend from the element whereby the outer housing may be mounted upon the element, and the projector.

The stem 26 is firmly affixed within the projector end 22, such as by an adhesive, and the vibratible diaphragm 38, and its associated electric motor 40, are attached to the element 24 by fasteners such as rivets, extending through the holes 34. The diaphragm 38 is of the conventional type having a circular periphery which is firmly affixed to the mounting surface 28, and the vibrating armature of the motor 40 is attached to the center of the diaphragm. The recess 30 is in alignment with the center of the diaphragm, and provides clearance for the center of the diaphragm, and the armature connection, during operation. As apparent in FIG. 2, the element surface 32 is slightly relieved as to provide clearance for the movement of the diaphragm during operation.

From FIG. 2 it will be appreciated that the inner surface of the element stem 26 is of a conical configuration diverging in the direction of the projection open end 20, and thus the lowermost portion of the projector, and the stem, define an inclined water draining surface having its lowermost portion at the bell end 20 whereby water received within the projector will drain therefrom under the influence of gravity.

The motor 40, and the rightmost end of the element 24, are housed within the two-part synthetic plastic housing 42. The housing parts are provided with an opening 44 to closely embrace the projector end 22, and mounting surfaces are located upon the housing 42 for cooperation with the ears 36. It will be apparent from FIGS. 1 and 2 that the vertical dimension of the housing 42 is substantially less than the horizontal dimensions of the housing, FIG. 1, and thus the housing has a low profile "flattened" configuration which is of a pleasing appearance.

As apparent in FIG. 2, the mounting surface 28 is obliquely relatd to the axis of the stem 26, which is coincident with the axis of the projector 14. The lowermost portion of the mounting surface 28 is disposed at the bottom of the stem and projector, and thus the generally planar diaphragm will be disposed at an oblique angle to the axis of the projector as shown in FIG. 2. Thus, any water within the element 24 between the diaphragm 38 and the surface 32 will flow from the diaphragm into the stem and from the projector. This self-draining feature resulting from the oblique orientation of the diaphragm prevents water from being trapped or accumulating within the diaphragm chamber, and eliminates heretofore experienced problems because of trapped water, which, in the past, have often shortened the life of horns, and rendered horns inoperative.

The electrical wires for supplying the diaphragm motor may pass through the base 10, FIG. 2, and it will be readily appreciated that the rapid vibration of the diaphragm 38 will produce the desired vibration within the element 24, stem 26 and projector 14 to produce the desired audible signal.

It is appreciated that various modifications may be apparent to the disclosed embodiment without departing from the inventive scope, and it is not intended that the invention be limited to the disclosed embodiment.

I claim:

1. A warning signal horn comprising, in combination, a horn support, an elongated tubular projector having an axis, an open end, and a diaphragm end mounted upon said support, a diaphragm housing mounted upon said projector diaphragm end and communicating therewith, a vibratible diaphragm of generally flat configuration within said housing having a periphery and a center, means supporting said diaphragm periphery adjacent said projector diaphragm end wherein the plane of said diaphragm is obliquely diposed to the axis of said projector, and diaphragm vibrating means within said housing connected to said center of said diaphragm for vibrating said diaphragm.

2. In a warning signal horn as in claim 1 wherein said projector diaphragm end includes a substantially planar annular diaphragm mounting surface having a plane obliquely disposed to the axis of said projector, and fastening means attaching said diaphragm periphery to said diaphragm mounting surface.

3. In a warning signal horn as in claim 2 wherein said diaphragm vibrating means comprises an electric vibrating motor.

4. In a warning signal horn as in claim 1 wherein said projector diaphragm end includes a substantially planar annular diaphragm mounting surface having a bottom and a top, the plane of said mounting surface being obliquely disposed to the axis of said projector whereby the bottom of said mounting surface comprises that portion of said mounting surface closest to said projector open end, and fastening means attaching said diaphragm periphery to said diaphragm mounting surface.

5. In a warning signal horn as in claim 4 wherein said diaphragm vibration means comprises a vibration motor, said motor being located within said housing, said housing having a generally vertically flattened configuration wherein the horizontal dimensions thereof are greater than the vertical dimension thereof.

6. In a warning signal horn as in claim 4 wherein said projector diaphragm end comprises a separate cast element having a tubular stem extending therefrom, said stem being received within said projector and said diaphragm mounting surface being defined on said cast element.

7. In a warning signal horn as in claim 6 wherein said tubular stem includes a conical surface converging in the direction toward said diaphragm supporting surface.

* * * * *